(12) United States Patent
Mockford (10) Patent No.: US 7,721,272 B2
(45) Date of Patent: *May 18, 2010

(54) TRACKING FILE ACCESS PATTERNS DURING A SOFTWARE BUILD

(75) Inventor: Kieran Paul Mockford, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 980 days.

This patent is subject to a terminal disclaimer.

(21) Appl. No.: 11/299,408

(22) Filed: Dec. 12, 2005

(65) Prior Publication Data

US 2007/0168974 A1 Jul. 19, 2007

(51) Int. Cl.
*G06F 9/45* (2006.01)
*G06F 9/44* (2006.01)

(52) U.S. Cl. ........... 717/140; 717/120; 717/144; 717/145; 717/151

(58) Field of Classification Search ........... 717/101, 717/120, 131, 151, 154, 155, 140, 144
See application file for complete search history.

(56) References Cited

U.S. PATENT DOCUMENTS

| 5,201,050 | A | | 4/1993 | McKeeman et al. ........ 395/700 |
|---|---|---|---|---|
| 5,204,960 | A | | 4/1993 | Smith et al. .............. 395/700 |
| 5,519,866 | A | | 5/1996 | Lawrence et al. .......... 395/700 |
| 5,671,398 | A | * | 9/1997 | Neubauer .................. 703/23 |
| 5,758,160 | A | | 5/1998 | McInerney et al. ........ 395/701 |
| 6,237,143 | B1 | * | 5/2001 | Fontana et al. ............ 717/127 |
| 7,571,434 | B1 | * | 8/2009 | Kamen et al. ............. 717/154 |
| 2002/0128803 | A1 | * | 9/2002 | Skinner et al. ............ 702/188 |
| 2003/0229891 | A1 | | 12/2003 | Neuer et al. .............. 717/174 |
| 2004/0139425 | A1 | * | 7/2004 | Zook ....................... 717/120 |
| 2004/0194060 | A1 | * | 9/2004 | Ousterhout et al. ........ 717/120 |
| 2004/0230942 | A1 | | 11/2004 | Garms et al. .............. 717/100 |
| 2005/0114847 | A1 | * | 5/2005 | Whalley ................... 717/140 |
| 2005/0262488 | A1 | * | 11/2005 | Wagner et al. ............ 717/144 |
| 2007/0006176 | A1 | * | 1/2007 | Spil et al. ................. 717/135 |
| 2007/0136718 | A1 | * | 6/2007 | Mockford ................. 717/127 |

FOREIGN PATENT DOCUMENTS

WO   WO 01/86477 A2   11/2001

OTHER PUBLICATIONS

Bates et al, "Incremental Program Testing Using Program Dependence Graphs", 1993 ACM 0.89791 .561.5/93/0001 /0384.*

Yellin at al, "INC: A Language for Incremental Computations", ACM Transactions on Programming Languages and Systems, vol. 13, No. 2, Apr. 1991, pp. 211-236.*

(Continued)

*Primary Examiner*—Wei Y Zhen
*Assistant Examiner*—Charles Swift
(74) *Attorney, Agent, or Firm*—Woodcock Washburn LLP (57) ABSTRACT

Those files accessed by tools during a build process are invisibly tracked in such a way that the information can then be used to drive an incremental build of just enough files to bring the build fully up to date. The tracking information includes the association between distinct tool processes. Each build tool has its own file activity tracked, each thread of operation within tools are tracked separately and a tracking log is associated with a chain of tool processes so that when the tracking logs are interpreted the context in which they were created is preserved.

19 Claims, 6 Drawing Sheets

OTHER PUBLICATIONS

Reiss, "An Approach to Incremental Compilation", Proceedings of the ACM SIGPLAN '84 Symposium on Compiler Construction SIGPLAN Noticea vol. 19, No. 6, Jun. 1984.*

Carroll et al, "A Framework for Incremental Extensible Compiler Construction", ICS'03, Jun. 23-26, 2003, San Francisco, California, USA. Copyright 2003 ACM 1-58113-733-8/03/0006.*

Ferrante et al, "The Program Dependence Graph and Its Use in Optimization", ACM Transactions on Programming Languages and Systems, vol. 9, No. 3, Jul. 1987, pp. 319-349.*

Karasick, "The Architecture of Montana: An Open and Extensible Programming Environment with an Incremental C++ Compiler", 1998 ACM 1-58113-108-9/98/0010.*

Chambers et al, "A Framework for Selective Recompilation in the Presence of Complex Intermodule Dependencies", 1995 ACM 0-89791-708-1 /95/0004.*

Herring et al, "Lazy and Incremental Program Generation", ACM Transactions on Progranun,ng Languages and Systems. Vd 16, No. 3, May 1994, pp. 1010-1023.*

Pollock et al, "Incremental Compilation of Locally Optimized Code", 1984 ACM 0-89791-147-4/85/001/0152.*

Evoy, S., et al., "Managed build system extensibility document," http://dev.eclipse.org, downloaded Sep. 27, 2005, 1-42.

Fowler, M., "Using the rake build language," http://www.martinfowler.com/artlciles/rake.html, updated Aug. 10, 2005, downloaded Sep. 29, 2005, 1-19.

Marchal, B., et al., "Working XML: take advantage of lesons learned by refactoring XM," http://www-128.ibm.com/developerworks/xml/library/x-wxxm28, Nov. 30, 2004, downloaded Sep. 29, 2005, 1-7.

* cited by examiner

TRACKING FILE ACCESS PATTERNS DURING A SOFTWARE BUILD

Cross-Reference To Related Applications

This application claims priority to U.S. patent application Ser. No. 11/299,414 filed on Dec. 12, 2005, entitled "USING FILE ACCESS PATTERNS IN PROVIDING AN INCREMENTAL SOFTWARE BUILD", the disclosures of which are incorporated in their entirety by reference herein.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2005, Microsoft Corp.

BACKGROUND

A software build is the process of creating the software application binaries for a software release. They are done in a periodic manner by build teams to provide baseline binaries (build outputs) for daily work of software developers. Build processes involve many tools that process build inputs. These build inputs may be files such as source code and content files, for example. These files may reference (invisibly to the build process) other files based solely on their content. Incremental builds for software faces a significant challenge that comes in two forms: determining which files are accessed for, read and/or write by a tool during a build and deciding which parts of a build to re-run when one or more files are changed in order to bring build outputs up to date. The problem with previous implementations is that they either resulted in an approximation at best of the actual dependencies of part of a build process (through "scanning" the file content), or the mechanism was entirely specific to the build tool itself.

In view of the foregoing, there is a need for a system that overcomes the drawbacks of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

For several embodiments, tracking file access patterns during a software build involves determining which files are accessed for read and which files are accessed for write by a software build tool resulting from the build. These indications are then recorded. These may be recorded in a separate list for each thread of a build tool that caused the access, such that each separate list is associated with a particular thread of a build tool. These accesses may be tracked by redirecting calls that would normally go to the operating system to a file access tracker and then determining by the file access tracker which of those calls are requests by a build tool to read, write or delete files during the build.

Other advantages and features of the invention are described below.

BRIEF DESCRIPTION OF THE DRAWINGS

A blocking local sense barrier is further described with reference to the accompanying drawings in which.

DETAILED DESCRIPTION

Certain specific details are set forth in the following description and figures to provide a thorough understanding of various embodiments of the invention. Certain well-known details often associated with computing and software technology (including software development) are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
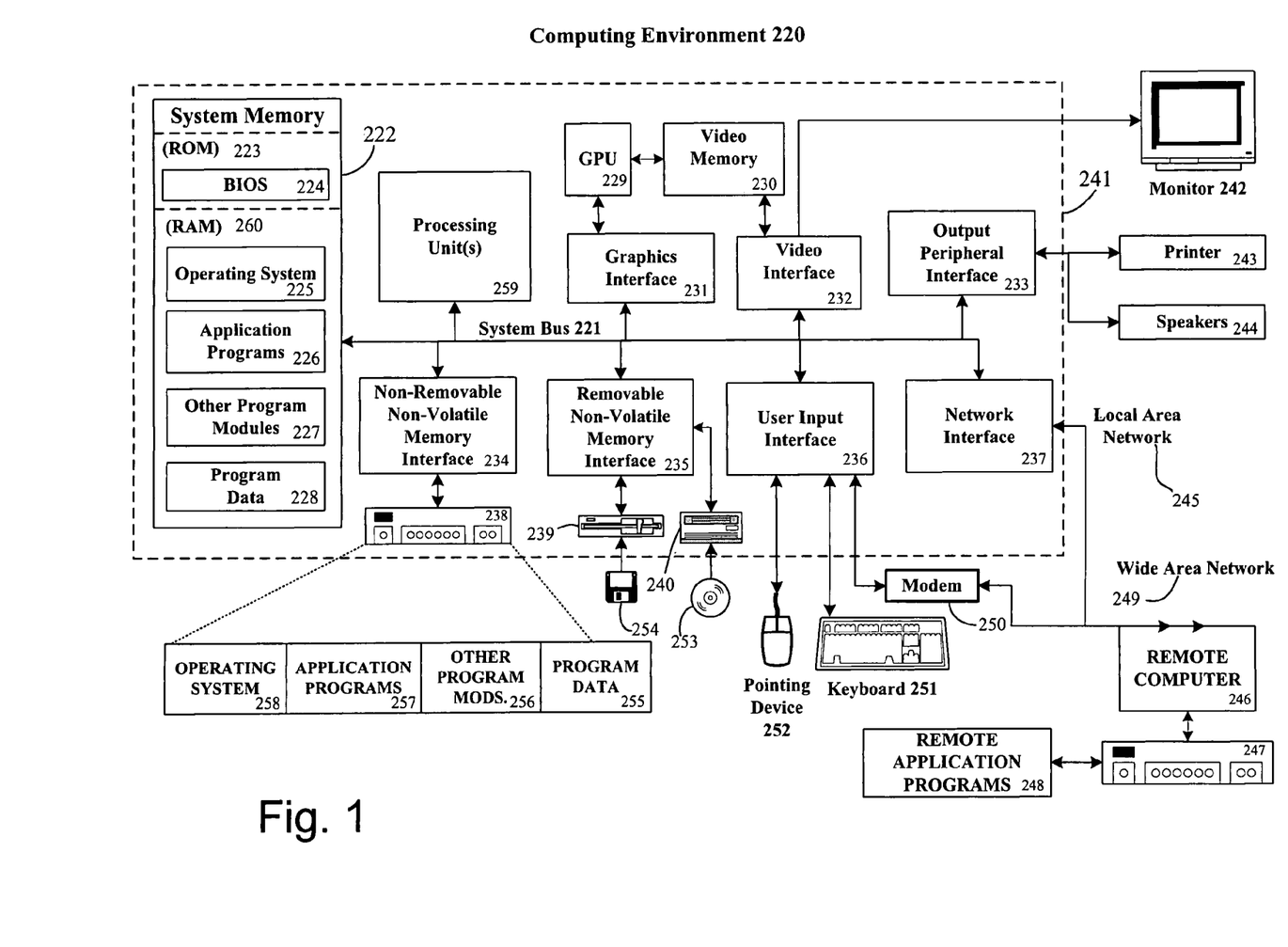
FIG. 1 is a block diagram representing an exemplary computing device suitable for use in conjunction with implementing the processes of FIGS. 3 through 6 for incremental software builds using file access patterns.

Referring to FIG. 1, shown is a block diagram representing an exemplary computing device suitable for use in conjunction with implementing the processes described above. For example, the computer executable instructions that carry out the processes and methods for incremental software builds using file access patterns may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessorbased systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
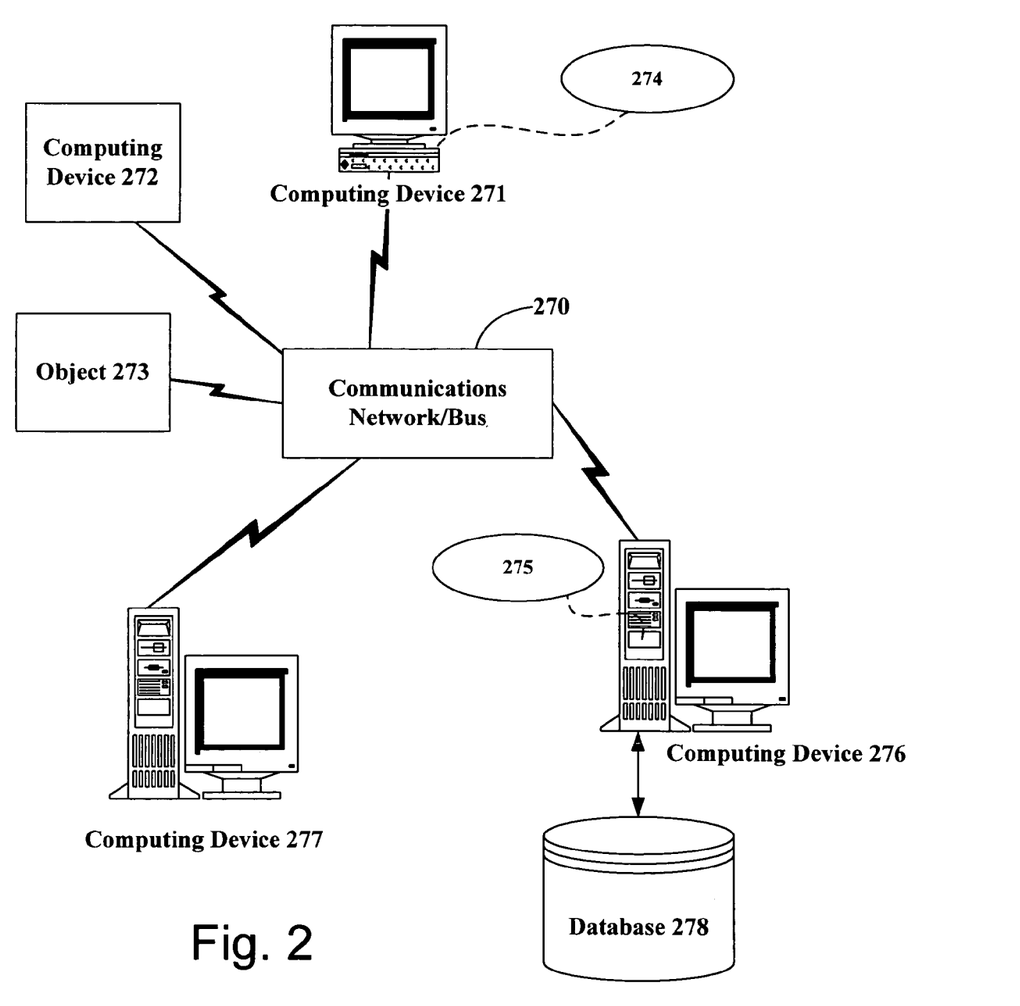
FIG. 2 illustrates an exemplary networked computing environment in which many computerized processes may be implemented to perform the processes of FIGS. 3 through 6 for incremental software builds using file access patterns.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing incremental software builds using file access patterns. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the invention should not be limited to any single embodiment, but rather should be construed in breadth and scope in accordance with the appended claims.

Figure 3:
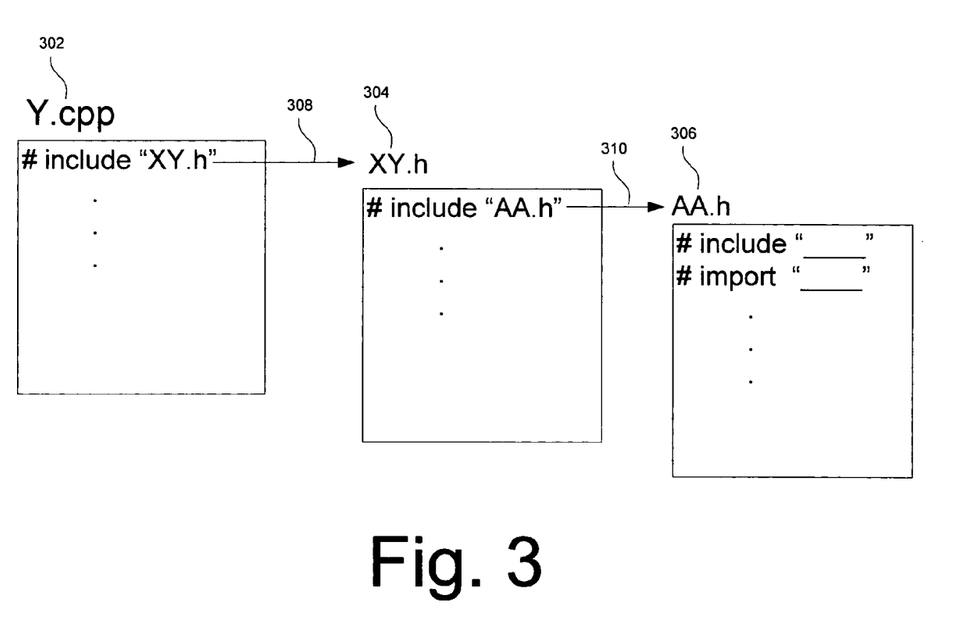
FIG. 3 is diagram illustrating example dependencies between files involved in an incremental software build using file access patterns.

Referring next to FIG. 3, shown is a diagram illustrating example dependencies between files involved in an incremental software build using file access patterns. Build processes involve many software build tools (i.e., tools) that process build inputs (i.e., files) 302 304 306. These files 302 304 306 may reference 308 310 (invisibly to the build process) other files based solely on their content. For example, the input file Y.cpp 302 references 308 the file XY.h 304, which in turn references 310 the file AA.h 306. These references are made, for example, using the "#include" language within the contents of the referencing file. In order to decide which parts of a build to re-run when one or more input files 302 304 306 are changed, so as to bring build outputs up to date, which input files 302 304 306 are accessed for read and/or write by a tool during a build is determined. This is accomplished by discovering raw file access information by tools during a build process. The raw file access information is discovery is not tied to any one build tool. The dependencies and associations between input files 302 304 306 are determined in order to tell which input files are dependent on those being accessed and, thus, may be involved in the parts of a build to re-run when one or more input files are changed.

Figure 4:
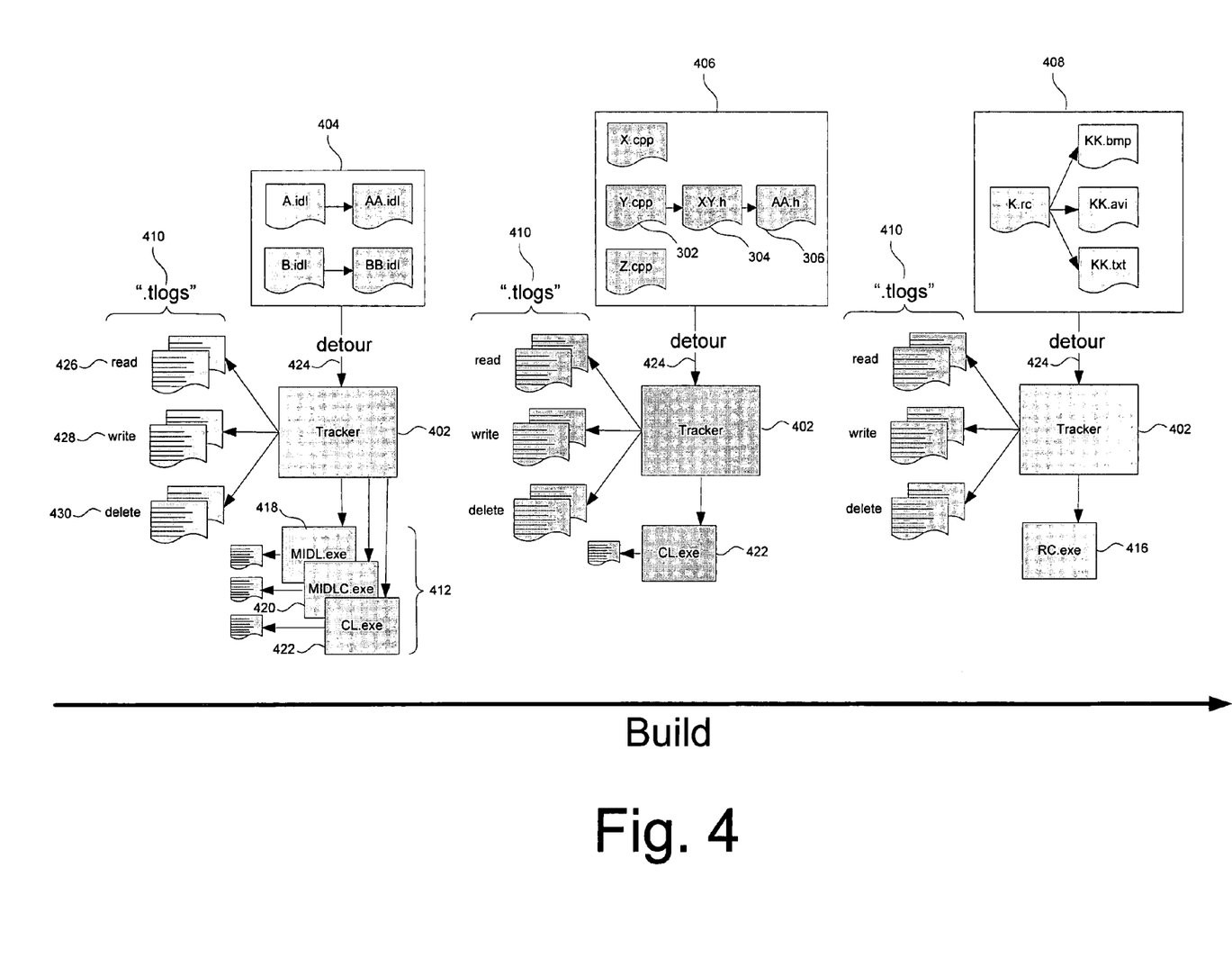
FIG. 4 is diagram illustrating a process showing an example of how file access patterns are tracked for use in an incremental software build.

Referring next to FIG. 4, shown is a diagram illustrating a process showing an example of how file access patterns are tracked for use in an incremental software build. The process of FIG. 4 invisibly tracks 402 those files 404 406 408 accessed by tools during a build process in such a way that the information can then be used to drive an incremental build of just enough files to bring the build fully up to date. The tracking information 410 includes the association between distinct tool processes 412 414 416. Since one tool 418 may invoke others 420 422 in order to perform processing, each and every tool (MIDL.exe 418, MIDLC.exe 420, CL.exe 422 and RC.exe 416, for example) has its file activity tracked 402. However, the tracking logs 410 are associated with a chain of tool processes so that when the tracking logs 410 are interpreted, the context in which they were created is preserved. In the example provided in FIG. 4, the tracking logs 410 gave a ".tlog" file name extension, and thus are referred to as ".tlogs." or tracking logs 410.

Multi-threaded tools are becoming more prevalent, so each thread of operation within tools 418 420 422 416 are tracked separately. This is to preserve not only the information about what files are being accessed, but the pattern of that access. If all threads were tracked together, this pattern would be lost. The pattern of file accesses is then interpreted in order to determine the associations between individual files in the build.

Each one of these build tools (MIDL.exe 418, MIDLC.exe 420, CL.exe 422 and RC.exe 416, for example) is typically an executable application in its own right. Typically, the build process without the tracker 402 will just be provided the input files 404 406 408 and run the appropriate tools on them. With the tracker 402, instead of the build process stating that a particular tool should be invoked, the tracker 402 is actually invoked instead. The full command that would normally be used to start this tool, say MIDL.exe 418, for example, is given to the tracker 402. This is accomplished by redirecting calls that would normally go to the operating system to the tracker 402 itself. Whenever a tool (using MIDL.exe 418 as an example) in the build process requests to open a file 404, it actually asks the tracker 402 to open it for it. The tracker 402 then remembers that it has been asked to open a file and asks the operating system to actually do it. One way of implementing this procedure is by using the Microsoft® Detours 2.0 software 424 available at http://research.microsoft.com/sn/detours/. Detours 424 is a library for instrumenting arbitrary Win32 functions on x86 machines. Detours 424 intercepts Win32 functions by re-writing target function images. Thus, Detours 424 can be used to hook file access application programming interfaces (APIs) to track what they do and provides a generalized way of getting between the application and the operating system.

As the tool 418 executes, the tracker 402 holds onto a number of lists 410 (i.e., ".tlogs"): all the files that were read 426, all the files that were written 428, and then at some point all the files that were deleted 430 during the build process. When this tool 402 finishes its work, these ".tlogs" 410 exist on disk.

In order to prevent the case of the tool 418 having multiple threads of activity that occur inside it concurrently and the tracker 402 having no way of knowing which thread of activity caused the read and write to happen, every time the tracker records a file it keeps it in a separate list, depending on the thread. The MIDL.exe toll 418 may have, for example, two threads of activity within it. Each thread is reading and writing files at the same time, but they are actually two separate pieces of work that need to be tracked. As the call is intercepted, the tracker 402 inquires with the operating system what thread the tracker 402 is on and the tracker puts it into a different list. Thus, there are potentially many lists 410 resulting for each tool 418 420 422 416, one for each thread of activity within the tool 418. This is important in order to prevent those threads of activity from polluting each other in the tracking block and to know in sequence each activity that goes on in the tool 418 (i.e., what its read-and-writes were) independently of anything else it might be doing.

Notice with MIDL.exe 418, there's a chain of tools 430 422 that gets invoked. In this case, the tracker 402 has also intercepted the operating system call for starting the next process so that it can automatically pass itself on to every tool 420 422 that gets invoked in a chain. Then each one of these tools 420

422 can write out to its log files 410, which will be named appropriately according to the tool in the chain that was invoked. The RC.exe tool 416 operates in a similar fashion, except it does not have this chain of events, so the mechanism used for MIDL.exe 418 works well for RC as well. Both of those tools 418 416 have a characteristic that they can only accept one primary file at a time. This means that every invocation is completely separate. However, CL.exe 422 is different in that it can be passed as many primary files as desired and it will just systematically jump through them. Therefore, when the tracker is invoked it is handed a list of all of the files (i.e., primary files) that are going to be processed by the CL.exe tool 422. As CL.exe 422 opens files, the tracker 402 looks up the file that it is opening in that list of primary files. If the tracker 402 finds the file, it writes a marker into the log 410 alongside the file that it has just written. Then all the files 406 that are then opened between that and the next primary file are associated with that primary file. As a result, in the log 410 appears a long list of files and every so often, a marker appears that indicates that a primary file had gone past. This indicates that that all of the files that follow the primary marker are associated with that primary file. The above works because the tool (CL.exe 422), opens the primary file and then goes on to write from the others. This also applies to the operation of the RC.exe tool. It opens the primary file and then goes on to open the secondary files (or the in-order files).

In the instance where there is a chain of tools, such as in the case of MIDL.exe 418, MIDLC.exe 420 and CL.exe 422, the downstream tools, MIDLC.exe 420 and CL.exe 422, don't actually open these primary files themselves. They open intermediate files that have been written by the prior tool. The association is therefore lost. It is no longer known by looking in the log of MIDLC.exe 420 that it was originally processing the particular file. However, the mechanism described above for telling the tracker 402 what the primary files are works just as well because the tracker 402 passes on that primary file information as each tool is invoked. Therefore, in the logs 410 for all of these downstream tools 420 422 is this primary file reference due to the tracker 402 having explicitly written it. The tracker puts the primary file information in the tracking log 410 regardless of whether the tool actually opens it or not. Therefore, the correct associations can be made even where there is a chain of tools, such as in the case of MIDL.exe 418, MIDLC.exe 420 and CL.exe 422.

Figure 5:
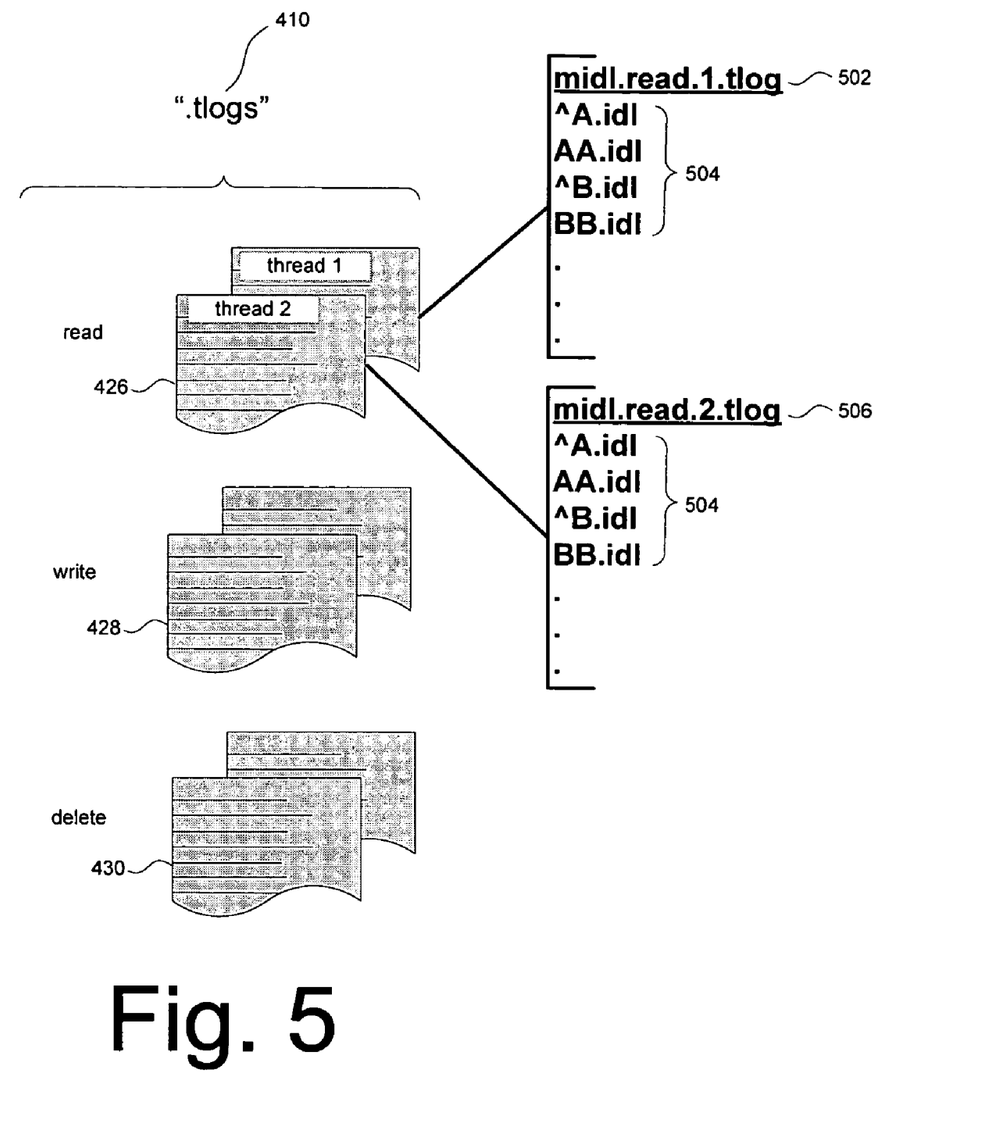
FIG. 5 is diagram illustrating example contents of a log file generated in connection with implementation of the process shown in FIG. 4 of how file access patterns are tracked in an incremental software build.

Referring next to FIG. 5, shown is diagram illustrating example contents of a log file generated in connection with implementation of the process shown in FIG. 4 of how file access patterns are tracked in an incremental software build. Due to the tracker 402 being invoked on many different tools 418 420 422 416, all the tracking information is not housed in the same file. Otherwise, it would be difficult to tell which tools resulted in which tracking information. Thus the tracking logs 410 are named along the lines of the tool used when creating the tracking log 410. For example, FIG. 5 shows midl.read.1.tlog 502. The first part of the name indicates the name of the tool. The example tracking log 502 in FIG. 5 has "midl" as is the name of the tool. This is associated with the tool MIDL.exe 418 of FIG. 4. The second portion indicates whether the log 410 is the read, write, or delete log file. Thus, midl.read.1.tlog 502 is a read tracking log 410. The third portion is the thread identification. Thus, midl.read.1.tlog 502 is a read tracking log 410 associated with the first thread of the MIDL.exe tool 418 and midl.read.2.tlog 506 is a read tracking log 410 associated with the second thread of the MIDL.exe tool 418. This information identifying each log file can go alternatively into a database. The fact that in the present example it is written to a log file 410 on disk does not indicate that it must be stored this way.

Within the tracking logs 410, names of the files that are accessed appear in a list 504. A root marker depicts the set of files known to be processed by the task (e.g. all the .cpp files for the CL.exe task 422). For example, this could appear as "^X.cpp|Y.cpp|Z.cpp" in a tracking log to indicate the files X.cpp Y.cpp Z.cpp as the set of files known to be processed by the CL.exe task 422. Also, a primary source marker indicates a single file from the root file set. For example, this could appear as "^Z.cpp" in a tracking log for CL.exe. In the example of FIG. 5, "^A.idl" indicates a single file from the root file set for MIDL.exe 418 in the tracking log midl.read.1.tlog 502.

Figure 6:
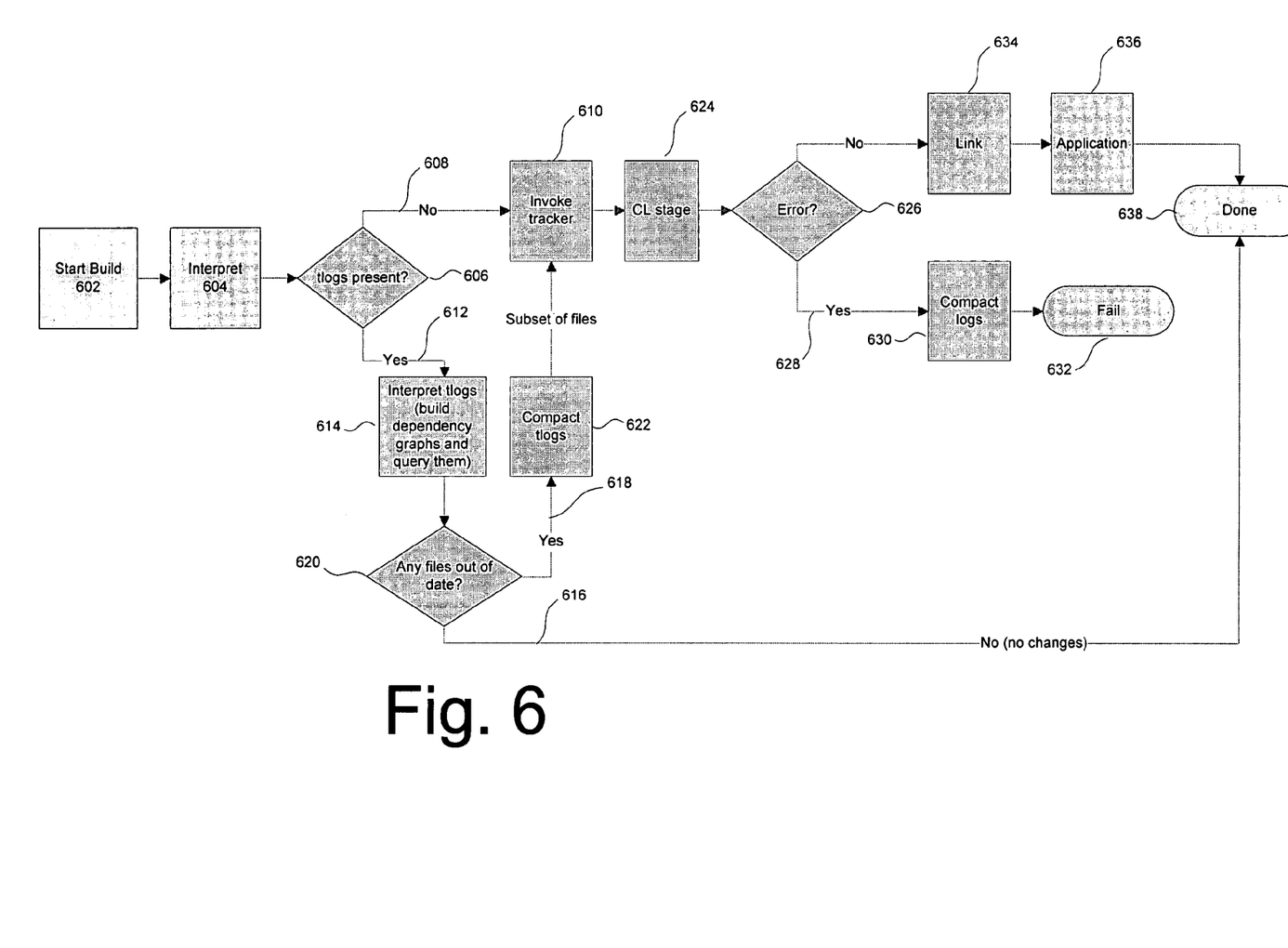
FIG. 6 is flow diagram illustrating an exemplary process of an incremental software build using file access patterns tracked according to the process of FIG. 4.

Referring next to FIG. 6, shown is flow diagram illustrating an exemplary process of an incremental software build using file access patterns tracked according to the process of FIG. 4. Once the tracker 402 are creates and collects the tracking logs. They are used in deciding which parts of a build to re-run to drive incremental build of just enough files to bring the build fully up to date. This is done by using the tracking logs 410 to determine which files that have been changed and thus need to be involved in the build in order to bring build outputs up to date. Once the build is started 602, the interpretation process 604 of the tracking logs 410 begins. First, it is determined 606 whether any tracking logs 410 are present. If not, every part of the build process must be re-run and the tracker is invoked 610 to start creating the tracking logs 410. If there are tracking logs present 612, then the tracking logs 410 are interpreted by building a dependency graph based upon the files in the tracking logs, which is then queried for out of date files 614 (those that have been changed since the last build). This is accomplished by reading all of the tracking information in and associating all the inputs with all the outputs (using the read tracking files 426 and write tracking files 428). The association is made that that while reading particular files the build process also wrote a set of particular files. A determination 620 is then made as to whether any of these files that the build process read are newer than any of the files that it wrote. If any of these files that the build process read are newer than any of the files that it wrote 618, then an indication is provided that the part of the build associated with those out of date files must be re-run. If there are not any out of date files, then the build does not have to be re-run 616. Otherwise 618, the tracking logs 410 are compacted 622 to remove unneeded entries, and a resulting subset of files (i.e., those that are out of date) is provided to the tracker to continue the build process and track new entries, re-running only the portion of the build (the CL.exe tool 624, for example) required to be completed due to the out of date files. A determination 626 is made as to whether there is an error in the build process (e.g., a compiler error). If so 628, the tracking logs are compacted 630 and the build fails 632. Otherwise, the build continues on to the link stage 634 creating the resulting application 636 at which point the process is completed 638.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A processor-implemented method for performing an incremental software build comprising:
   (a) upon a build request, intercepting at least one build tool command respectively associated with at least one build tool from an operating system in a multi-threaded environment, wherein each of the at least one build tool is respectively associated with at least one thread of operation and each of the at least one thread is tracked separately;
   (b) intercepting a call made respectively by one of the at least one build tool to the operating system;
   (c) querying the operating system regarding a current thread associated with the call;
   (d) receiving information from the operating system regarding the current thread;
   (e) generating an entry in a tracking log file based upon the information, wherein the tracking log file is associated with a name of a build tool, the current thread, and whether the call is made to access a file for one of a read, write or delete;
   (f) repeating (b)-(e) for all calls associated with the at least one build tool;
   (g) generating a dependency graph based upon at least one tracking log file;
   (h) determining at least one out of date file based upon the dependency graph; and
   (i) performing the incremental software build as a function of the at least one out of date file.

2. The method of claim 1 further comprising:
   configuring a file access tracker to redirect intercepted calls to an operating system.

3. The method of claim 2 further comprising:
   determining which files are accessed for deletion by a build tool during a first build process; and
   recording indications of files that are accessed for one of reading and writing by the build tool during the first build process.

4. The method of claim 3 wherein each tracking log file comprises a list of a first set of files that were read and a second set of files that were written during an operation of the associated thread.

5. The method of claim 4 further comprising:
   upon detection of a build tool opening a file, determining whether the file exists in a list of all primary files that are going to be accessed by the build tool; and
   if the file exists in the list, placing a marker in an associated tracking log file to indicate that all files opened after the marker and before a next primary file are associated with a previous primary file.

6. The method according to claim 1, wherein the incremental build comprises a portion of a full build, the portion determined as a function of at least one out of date file.

7. The method according to claim 1 wherein each tracking log file is associated with a name comprising a first portion indicating a name of an associated build tool, a second portion indicating whether the tracking log file is associated with a read, write or delete and a third portion indicating an associated thread.

8. A computer readable storage medium having instructions thereon for performing an incremental software build, said instructions comprising:
   upon a build request, intercepting at least one build tool command respectively associated with at least one build tool from an operating system in a multi-threaded environment, wherein each of the at least one build tool is respectively associated with at least one thread of operation and each of the at least one thread is tracked separately:
   (a) intercepting a call made respectively by one of the at least one build tool to the operating system;
   (b) querying the operating system regarding a current thread associated with the call;
   (c) receiving information from the operating system regarding the current thread;
   (d) generating an entry in a tracking log file based upon the information, wherein the tracking log file is associated with a name of a build tool, the current thread, and whether the call is made to access a file for one of a read, write or delete;
   (e) repeating (a)-(d) for all calls associated with the at least one build tool;
   generating a dependency graph based upon at least one tracking log file;
   determining at least one out of date file based upon the dependency graph; and
   performing the incremental software build as a function of the at least one out of date file.

9. The computer readable storage medium of claim 8 further comprising instructions for:
   determining which files are accessed for deletion by a build tool; and
   recording indications of files that are accessed for one of reading and writing by the build tool.

10. The computer readable storage medium of claim 8 wherein each tracking log file comprises a list of a first set of files that were read and a second set of files that were written during an operation of the associated thread.

11. The computer readable medium of claim 9 further comprising instructions for:
   upon detection of a build tool opening a file, determining whether the file exists in a list of all primary files that are going to be accessed by the build tool; and
   if the file exists in the list, placing a marker in an associated tracking log file to indicate that all files opened after the marker and before a next primary file are associated with a previous primary file.

12. A system for performing an incremental software build comprising:
   means for upon a build request employing at least one build tool, wherein each of the at least one build tool is respectively associated with at least one thread of operation, tracking at least one file access performed by each of the at least one build tool to generate at least one respective tracking log, wherein each of the at least one thread is tracked separately;
   means for intercepting a call made respectively by one of the at least one build tool to an operating system;
   means for querying the operating system regarding a current thread associated with the call;
   means for receiving information from the operating system regarding the current thread;
   means for generating an entry in a tracking log file based upon the information, wherein the tracking log file is associated with a name of a build tool, the current thread, and whether the call is made to access a file for one of a read, write or delete;
   means for generating a dependency graph based upon at least one tracking log file;

means for determining at least one out of date file based upon the dependency graph; and means for performing the incremental software build as a function of the at least one out of date file.

13. The system of claim 12 further comprising:

means for intercepting calls that would normally go to an operating system to a file access tracker; and configuring the file access tracker to redirect intercepted calls to an operating system.

14. The system of claim 12 further comprising tracking file accesses for each of a plurality of threads separately.

15. The system of claim 14 further comprising:

means for determining which files are accessed for deletion by a build tool; and recording indications of the files that are accessed for one of reading and writing by the build tool.

16. The system of claim 15 wherein the means for recording indications of the files that are accessed further comprises recording indications of files that are accessed in a separate list for each thread of a build tool that caused an access, such that each separate list is associated with a particular thread of the build tool.

17. The system of claim 16 further comprising:

means for providing a list of all primary files that are going to be accessed by a particular build tool; and means for associating with a first primary file in the list, all the files that are accessed after the first primary file in the list and a next primary file in the list of primary files provided.

18. A system for performing an incremental software build comprising:

a file access tracker, wherein the file access tracker during a first build process employing at least one build tool, tracks at least one file access performed by each of the at least one build tool to generate at least one respective tracking log file wherein each build tool comprises a plurality of software threads and tracking at least one file access performed by each of the at least one build tool further comprises tracking file accesses for each of the plurality of threads separately and wherein each tracking log file is associated with a respective thread and comprises a list of a first set of files that were read and a second set of files that were written during an operation of the associated thread, wherein the file access tracker intercepts a call made respectively by one of the at least one build tool to an operating system, queries the operating system regarding a current thread associated with the call, receives information from the operating system regarding the current thread and generates an entry in a tracking log file based upon the information, wherein the tracking log file is associated with a name of a build tool, the current thread, and whether the call is one of a read, write or delete;

a processor, wherein the processor is configured to upon a build request, perform an incremental build by:

generating a dependency graph based upon at least one tracking log file;

determining at least one out of date file based upon the dependency graph; and performing the incremental build as a function of the at least one out of date file.

19. The system according to claim 18 wherein each tracking log file is associated with a name comprising a first portion indicating a name of an associated build tool, a second portion indicating whether the tracking log file is associated with a read, write or delete and a third portion indicating an associated thread.

* * * * *